United States Patent
Tang

(10) Patent No.: US 10,642,699 B2
(45) Date of Patent: May 5, 2020

(54) BLOCKCHAIN-BASED CONSENSUS METHOD AND DEVICE

(71) Applicant: Alibaba Group Holding Limited, George Town (KY)

(72) Inventor: Qiang Tang, Chengdu (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/502,612

(22) Filed: Jul. 3, 2019

(65) Prior Publication Data

US 2019/0324867 A1 Oct. 24, 2019

Related U.S. Application Data

(63) Continuation of application No. PCT/CN2018/080513, filed on Mar. 26, 2018.

(30) Foreign Application Priority Data

Mar. 28, 2017 (CN) .......................... 2017 1 0190786

(51) Int. Cl.
*G06F 11/00* (2006.01)
*G06F 11/14* (2006.01)
*G06F 11/20* (2006.01)

(52) U.S. Cl.
CPC ...... *G06F 11/1469* (2013.01); *G06F 11/1464* (2013.01); *G06F 11/2033* (2013.01); *G06F 2201/82* (2013.01)

(58) Field of Classification Search
CPC ............. G06F 11/1469; G06F 11/1464; G06F 11/2033; G06F 2201/82
See application file for complete search history.

(56) References Cited

U.S. PATENT DOCUMENTS 6,215,766 B1 * 4/2001 Ammar ............... H04L 12/1886
                                                                370/229
9,690,675 B2 * 6/2017 Madduri ............. G06F 11/2005
(Continued)

FOREIGN PATENT DOCUMENTS

CN         101394306        3/2009
CN         101523355        9/2009
(Continued)

OTHER PUBLICATIONS

PCT International Search Report and Written Opinion in International Application No. PCT/CN2018/080513, dated May 11, 2018, 9 pages (with partial English translation).
(Continued)

*Primary Examiner* — Marc Duncan
*Assistant Examiner* — Jonathan D Gibson
(74) *Attorney, Agent, or Firm* — Fish & Richardson P.C.

(57) ABSTRACT

This specification describes techniques for blockchain-based consensus. One example method includes storing, by a database of a blockchain node, consensus data needed for performing a consensus procedure, wherein the consensus data is retrievable by a first server and a second server during the consensus procedure, wherein the blockchain node is included in a blockchain and comprises the first server, the second server, and the database; in response to a determination that the first server is faulty, retrieving, by the second server in place of the first server, the consensus data from the database and executing the consensus procedure based on the consensus data to generate a consensus result; and storing, by the second server, the consensus result in the database.

17 Claims, 9 Drawing Sheets

(56) References Cited

U.S. PATENT DOCUMENTS

| | | | |
|---|---|---|---|
| 2015/0172412 A1 | 6/2015 | Escriva et al. | |
| 2016/0019125 A1* | 1/2016 | Madduri | G06F 11/2005 |
| | | | 714/4.11 |
| 2016/0125403 A1 | 5/2016 | Hu et al. | |
| 2018/0062831 A1* | 3/2018 | Zhang | H04L 9/0637 |
| 2018/0123882 A1* | 5/2018 | Anderson | H04L 41/0813 |
| 2018/0267539 A1* | 9/2018 | Shih | G05D 1/0295 |

FOREIGN PATENT DOCUMENTS

| | | |
|---|---|---|
| CN | 102724272 | 10/2012 |
| CN | 103220165 | 7/2013 |
| CN | 103744809 | 4/2014 |
| CN | 105912618 | 8/2016 |
| CN | 106209877 | 12/2016 |
| CN | 106296191 | 1/2017 |
| CN | 106339639 | 1/2017 |
| CN | 106341421 | 1/2017 |
| CN | 106452785 | 2/2017 |
| CN | 106528775 | 3/2017 |
| CN | 106534273 | 3/2017 |
| CN | 107368507 | 11/2017 |
| TW | 201643783 | 12/2016 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

[No Author Listed], "Load balancing and failover—RimuHosting," Apr. 2015, retrieved on Oct. 22, 2019, retrieved from URL <:https://web.archi ve.org/web/20150422151533/http://rimuhosting.com/knowledgebase/rimuhosting/load-balancing-and-failover>, 6 pages.

Extended European Search Report in European Application No. 18777158.9, dated Oct. 22, 2019, 11 pages.

Mastering Bitcoin—Unlocking Digital Cryptocurrencies, 1st ed., O'Reilly Media, Inc., Dec. 2014, pp. 180, 200, 211.

PCT International Preliminary Report on Patentability in International Application No. PCT/CN2018080513, dated Oct. 1, 2019, 10 pages (with English translation).

\* cited by examiner

BLOCKCHAIN-BASED CONSENSUS METHOD AND DEVICE

CROSS-REFERENCE TO RELATED APPLICATIONS

This application is a continuation of PCT Application No. PCT/CN2018/080513, filed on Mar. 26, 2018, which claims priority to Chinese Patent Application No. 201710190786.1, filed on Mar. 28, 2017, and each application is hereby incorporated by reference in its entirety.

TECHNICAL FIELD

The present application relates to the field of computer technologies, and in particular, to a blockchain-based consensus method and device.

BACKGROUND

Currently, the blockchain technology is widely applied, and its decentralization mode ensures that data is not easily tampered with, thereby improving security.

In a practical application scenario, a blockchain can provide a corresponding service for a client, and a blockchain node can process a service request of a user and generate a corresponding processing result. However, the blockchain may include a malicious node or a faulty node. It undoubtedly affects the service obtained by the client. Therefore, for example, a Practical Byzantine Fault Tolerance (PBFT)-based consensus procedure can be performed between nodes in the blockchain, so that the nodes can agree on a correct processing result.

The PBFT-based consensus procedure is used as an example. As shown in FIG. 1, the PBFT-based consensus procedure includes a pre-prepare (pre-prepare) stage, a prepare (prepare) stage, and a commit (commit) stage. A node (a node numbered 0 in FIG. 1) that receives a service request from a client (represented by C in FIG. 1) sends the service request to other nodes (for example, nodes numbered 1, 2, and 3) for performing a consensus procedure. At each stage, the nodes send a consensus message to each other, so that the nodes perform a consensus procedure. After the three-stage consensus procedure, it can be considered that a consensus is reached. In this case, the nodes separately process the service request, and each feed back a processing result to the client.

In some scenarios in the existing technology, to process a large amount of consensus procedures, a plurality of servers are usually disposed in each node in the previously described blockchain, and different servers can separately participate in different consensus procedures, to improve a processing amount and processing efficiency of the blockchain.

However, in practice, a server in a node may be faulty, for example, may be offline or restarted. For example, in the PBFT-based consensus procedure, once a server is faulty, the server cannot continue participating in consensus and affects the probability of reaching a consensus. If a consensus is not reached at a certain round, consensus needs to be re-initiated from the pre-prepare stage, regardless of a consensus stage that the blockchain is currently at. Apparently, it undoubtedly affects blockchain consensus efficiency, and further affects service processing efficiency of the blockchain.

SUMMARY

Implementations of the present application provide a blockchain-based consensus method and device, to resolve a current problem that consensus efficiency is relatively low when a server in a node is faulty.

An implementation of the present application provides a blockchain-based consensus method. One blockchain node includes a first server, a second server, and at least one database. The method includes: storing, by the database, consensus data needed for performing a consensus procedure, where the consensus data is invoked by the first server and the second server during the consensus procedure; obtaining, by the second server in place of the first server, consensus data from the database, and executing the consensus procedure based on the consensus data to generate a consensus result, in response to determining that the first server is faulty before the consensus procedure or during the consensus procedure; and storing, by the second server, the consensus result in the database.

An implementation of the present application provides a blockchain-based consensus device, where one blockchain node includes a first server, a second server, and at least one database; the database stores consensus data needed for performing a consensus procedure, where the consensus data is invoked by the first server and the second server during the consensus procedure; the first server is faulty before the consensus procedure or during the consensus procedure; and the device includes: an acquisition module, configured to obtain consensus data corresponding to a consensus message from the database based on the consensus message; a consensus execution module, configured to execute the consensus procedure based on the consensus data to generate a consensus result; and a storage module, configured to store the consensus message and the consensus result in the database.

According to the blockchain-based consensus method and device provided in the implementations of the present application, for each server in a blockchain node, a server participating in a certain consensus procedure "publicly" stores consensus messages at different consensus stages or a consensus result generated by the server at a current stage. In other words, the server stores, in a database in the blockchain node, the consensus messages at the different consensus stages or the consensus result generated by the server at the current stage, and the database can be used for all servers in the blockchain node. As such, if a server participating in a certain round of consensus is faulty, for example, is offline or restarted, consensus data of the server can be used by another server in the blockchain node, and the another server can continue executing the corresponding consensus procedure in place of the faulty server.

Apparently, compared with the existing technology, in the method that each server in a blockchain node stores consensus data in a database in the blockchain node, even when a certain server is faulty, a normally-running server can obtain corresponding consensus data from the database and complete consensus in place of the faulty server. It ensures normal execution of the consensus procedure, and can improve a success rate of the consensus procedure to a certain extent while the number of consensus re-initiation times is reduced, thereby improving service processing efficiency of a blockchain.

BRIEF DESCRIPTION OF DRAWINGS

The accompanying drawings described here are intended to provide a further understanding of the present application, and constitute a part of the present application. The illustrative implementations of the present application and descriptions thereof are intended to describe the present application, and constitute no limitation on the present application. In the accompanying drawings.

DESCRIPTION OF IMPLEMENTATIONS

To make the objectives, technical solutions, and advantages of the present application clearer, the following clearly and comprehensively describes the technical solutions of the present application with reference to specific implementations and corresponding accompanying drawings of the present application. Apparently, the described implementations are merely some rather than all of the implementations of the present application. All other implementations obtained by a person of ordinary skill in the art based on the implementations of the present application without creative efforts shall fall within the protection scope of the present application.

As described above, during any time of consensus executed among nodes in a blockchain, a server participating in the current time of consensus in any node may be faulty, for example, may be offline or restarted, and consequently the server cannot continue participating in the consensus. Therefore, a consensus success rate may be reduced. In particular, in a PBFT-based consensus case, a certain number of consensus failures may trigger a garbage collection mechanism under PBFT, to clean consensus data in each server. Apparently, it undoubtedly affects service processing of the blockchain.

Based on the previous descriptions, the implementations of the present application provide a blockchain-based consensus method. In the method, consensus data is stored in a database in a blockchain node, so that when a server is faulty (is offline or restarted), a normally-running server in the blockchain node can also read the consensus data that has been stored in the database, and continue executing a consensus procedure in place of the faulty serve. Certainly, the blockchain-based consensus method in the implementations of the present application is not limited only to a PBFT-based consensus procedure, and can be further used in a consensus procedure that is based on a consensus algorithm such as Paxos.

Figure 1:
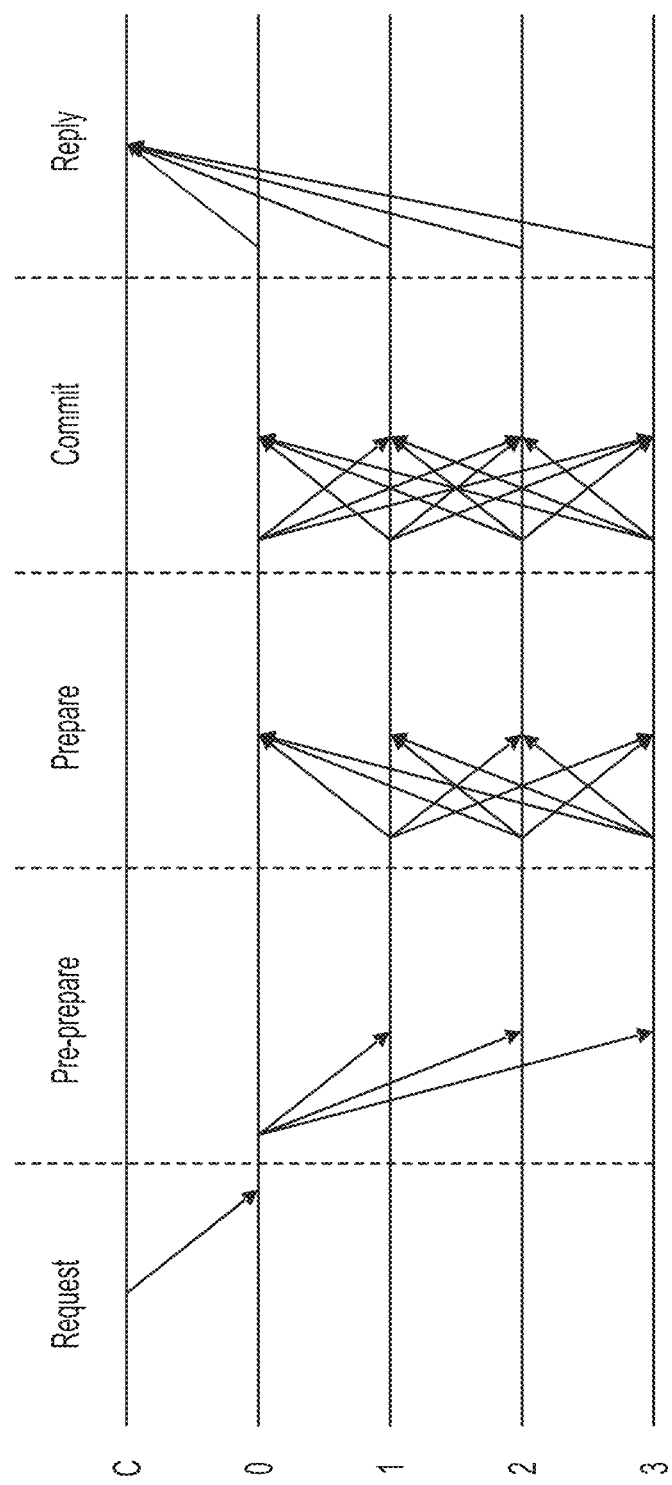
FIG. 1 illustrates a PBFT-based consensus procedure in the existing technology.
Figure 2A:
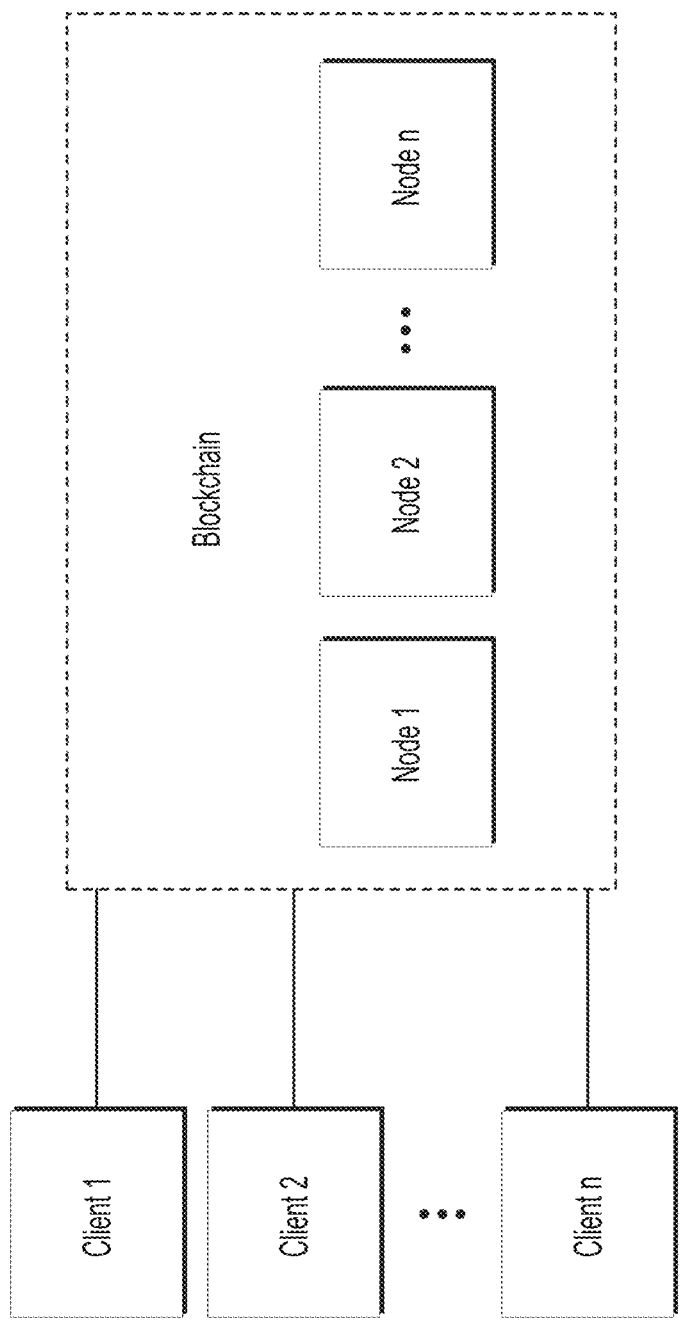
FIG. 2a illustrates an architecture of a blockchain in a blockchain-based consensus procedure, according to an implementation of the present application.

It is worthwhile to note that, in the implementations of the present application, an architecture used in the blockchain-based consensus method is shown in FIG. 2a. It can be seen from FIG. 2a that, a blockchain includes a plurality of blockchain nodes. For ease of subsequent description, a blockchain node is briefly referred to as a node below.

A plurality of clients can perform service interaction with the blockchain. The blockchain can be a consortium chain and/or a private chain, and can provide a service for a user. The client may include a browser, an application, etc. The client can run in a terminal, a server, a database, etc. Implementations are not specifically limited here.

Figure 2B:
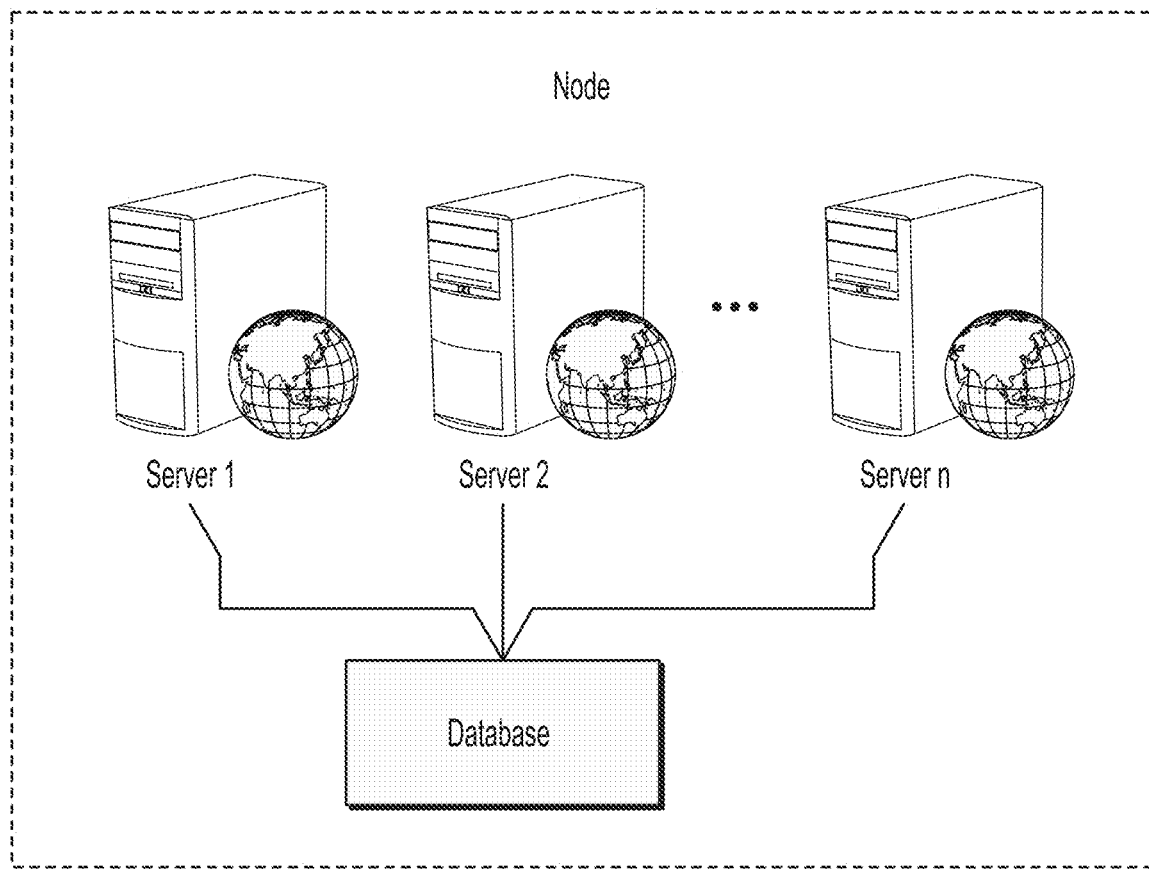
FIG. 2b illustrates an architecture of a blockchain node in a blockchain-based consensus procedure, according to an implementation of the present application.

Based on the architecture shown in FIG. 2a, an architecture of any node can be shown in FIG. 2b. It can be seen from FIG. 2b that, the node includes n servers and one database shared by the servers. Different servers can participate in different consensus procedures, and the servers can run independently of each other. The database is configured to provide a data storage service for the servers in the node. In other words, each server can store corresponding consensus data in the database in a consensus procedure. Certainly, the number of databases in the node shown in FIG. 2b is merely a common number. In practice, the number of databases in the node can be adjusted based on an actual demand. In addition, in some scenarios, the server in the node can be replaced with a device that has a computing processing function, such as a computer.

It is further worthwhile to note that, for ease of description, in the following, a server that may be faulty during running is referred to as a first server, and a server that can run normally is referred to as a second server. Therefore, in the architecture shown in FIG. 2b, it can be considered that the architecture includes two types of servers: the first server and the second server. The previous content shall not be construed as a limitation on the present application.

Figure 2C:
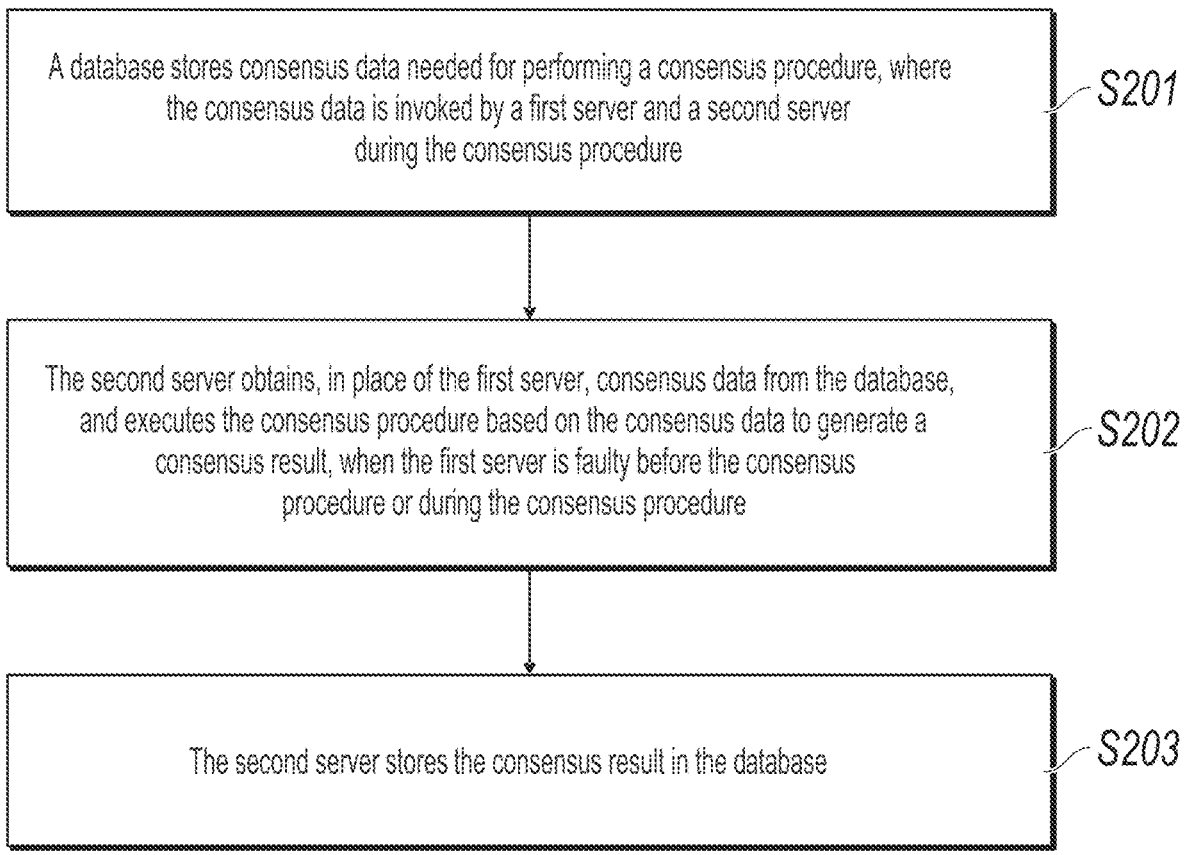
FIG. 2c illustrates a blockchain-based consensus procedure on a server side, according to an implementation of the present application.

Based on the relationship architecture shown in FIG. 2b, an implementation of the present application provides a blockchain-based consensus procedure. As shown in FIG. 2c, the procedure specifically includes the following steps.

S201. A database stores consensus data needed for performing a consensus procedure, where the consensus data is invoked by a first server and a second server during the consensus procedure.

Based on the architecture in FIG. 2b, the database is disposed in a node that the servers are located in, and is shared by all the servers in the node. After receiving a consensus message or generating a consensus result, any server in the node stores the consensus message or the consensus result in the database. Then, a server can obtain, from the database, consensus data needed for performing a consensus procedure. The consensus data can include a consensus message that is received by the server from a server in another node, a consensus result generated by the server, a service request that is sent by a client and that can trigger a consensus procedure, etc.

It is worthwhile to note here that storing the consensus data in the database ensures that the consensus data is available to all the servers in the node. That is, if the first server is faulty, although the first server cannot continue participating in consensus, the second server in the node can execute the consensus in place of the faulty server based on the consensus data stored in the database.

S202. The second server obtains, in place of the first server, consensus data from the database, and executes the consensus procedure based on the consensus data to generate a consensus result, in response to determining that the first server is faulty before the consensus procedure or during the consensus procedure.

During practical running, the first server participating in the consensus may be faulty (for example, may be break down or restarted), and the fail may happen in a random occasion, but implementation of the consensus procedure is affected regardless of whether the first server is faulty before the consensus procedure or during the consensus procedure. In this case, to ensure that the consensus procedure is not affected, the normally-running second server in the blockchain node can execute the consensus in place of the faulty first server.

As the first server is faulty and cannot continue executing the consensus. Therefore, the second server can receive a consensus message in place of the first server, and participate in the consensus procedure that the first server originally participates in.

As described above, any server in the node stores consensus data in the database, so that the second server can search the database for and obtain the consensus data needed in the consensus procedure, to execute the consensus in place of the faulty first server, and further generate the corresponding consensus result.

Apparently, the normally-running server executes the consensus in place of the faulty server, so that it is ensured that the consensus procedure is not affected.

S203. The second server stores the consensus result in the database.

In this implementation of the present application, the second server that executes the consensus in place of the first server also stores the consensus result in the database as a type of consensus data based on a data storage mechanism in the present application.

According to the previous steps, for each server in a blockchain node, a server participating in a certain consensus procedure "publicly" stores consensus messages at different consensus stages or a consensus result generated by the server at a current stage. In other words, the server stores, in a database in the blockchain node, the consensus messages at the different consensus stages or the consensus result generated by the server at the current stage, and the database can be used for all servers in the blockchain node. As such, if a server participating in a certain round of consensus is faulty, for example, is offline or restarted, consensus data of the server can be used by another server in the blockchain node, and the another server can continue executing the corresponding consensus procedure in place of the faulty server.

Apparently, compared with the existing technology, in the method that each server in a node stores consensus data in a database in the node, even when a certain server is faulty, a normally-running server can obtain corresponding consensus data from the database and complete consensus in place of the faulty server. It ensures normal execution of the consensus procedure, and can improve a success rate of the consensus procedure to a certain extent while the number of consensus re-initiation times is reduced, thereby improving service processing efficiency of a blockchain.

It is worthwhile to note here that, during the consensus procedure, any server in the node receives a consensus message that is sent by another device participating in the same consensus procedure. The another device includes but is not limited to another node and/or client participating in the consensus procedure. The consensus message can include a service request that is sent by a client and that can trigger consensus, or can include consensus data sent by another node in the consensus procedure.

Apparently, for a certain consensus procedure, if the first server is faulty, the second server receives a consensus message in place of the first server, to participate in the consensus procedure of the first server.

Therefore, in response to determining that the first server is faulty before the consensus procedure, that the second server obtains, in place of the first server, consensus data from the database can include: receiving, by the second server in place of the first server, a consensus message that is sent by another device participating in the consensus procedure, and obtaining consensus data corresponding to the consensus message from the database based on the consensus message, in response to determining that the first server is faulty before the consensus procedure.

In addition, in this implementation of the present application, there is a reattempt mechanism. Specifically, after another device that participates in the consensus procedure sends a certain consensus message or service request, the another device resends the same consensus message or service request if the another device receives no response from a peer end within a specified time. It can be learned that if the first server is faulty during the consensus procedure, the first server cannot respond to another device at the specified time.

Therefore, in response to determining that the first server is faulty during the consensus procedure, the second server receives, in place of the first server, a consensus message that another device participating in the consensus procedure reattempts to send, and obtains consensus data corresponding to the consensus message from the database based on the consensus message.

The second server usually obtains consensus data from the database based on a corresponding identifier in a consensus message. The following describes a process of obtaining consensus data from the database.

During a PBFT-based consensus procedure, one service request corresponds to one consensus procedure, and a node (also referred to as a master node) that receives a service request from a client numbers (e.g., indexes) the service request. In other words, a number associated with the service request can uniquely correspond to one consensus procedure.

Specifically, in a certain consensus procedure that any server in a node participates in, a number (namely, a service request identifier) of a service request in the consensus procedure can uniquely identify one consensus procedure. The number associated with the service request can be used to distinguish the consensus procedure from a consensus procedure that another server in the node participates in. Therefore, if the server receives a consensus message that carries a number associated with a certain service request, the server can obtain consensus data (the obtained consensus data and the consensus message belong to the same consensus procedure) that has the same service request number from the database based on the service request number.

For example, in a consensus procedure, a format of a consensus message can be: <consensus stage identifier, a view number, a service request number, and a service request digest>. It is assumed that a server receives a certain consensus message <commit, v, n, D(m)>, where commit indicates that the node has entered a commit stage, v indicates a view number, n indicates a number associated with a service request, and D(m) indicates a signature, of a node sending a notification message, for the service request. In this case, the server can search the database for all consensus data corresponding to the number "n" based on the number "n".

Based on the previous descriptions, a process of obtaining, by the second server from the database, the consensus data corresponding to the consensus message is as follows: The second server searches, based on a service request identifier included in the consensus message, the database for and obtains the consensus data corresponding to the identifier.

Figure 2D:
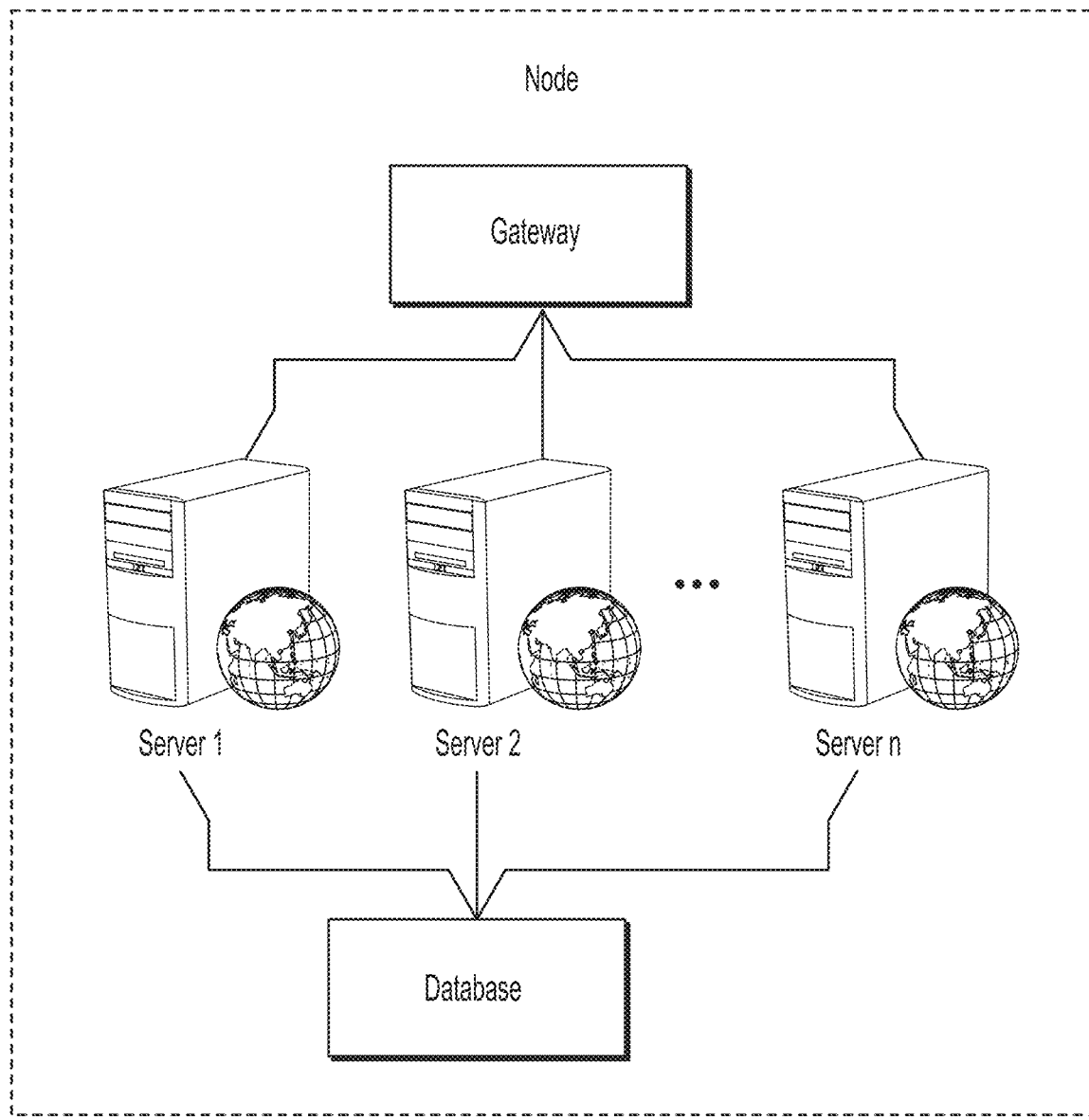
FIG. 2d illustrates an architecture of another type of blockchain node, according to an implementation of the present application.

In addition to the previous content, in practice, to prevent a consensus message from being sent to the faulty first server, in this implementation of the present application, the consensus message can be scheduled by using a gateway in the node. That is, the blockchain node further includes the gateway. In this case, an architecture of the node can be shown in FIG. 2d. It can be seen that the gateway is responsible for scheduling a consensus message for the server in the node. Once the first server is faulty, the gateway does not send a consensus message to the faulty first server; instead, sends the consensus message to the normally-running second server.

Therefore, specifically, for the second server, a process of receiving a consensus message can be as follows:

The gateway forwards, to the normally-running second server, the received consensus message that is sent by the another device participating in the consensus procedure, when the gateway determines that the first server is faulty before the consensus procedure. In this case, the second server receives the consensus message that is sent by the another device participating in the consensus procedure and that is forwarded by the gateway.

In addition, the gateway forwards, to the normally-running second server, the received consensus message that the another device participating in the consensus procedure reattempts to send, when the gateway determines that the first server is faulty during the consensus procedure. Correspondingly, the second server receives the consensus message that the another device participating in the consensus procedure reattempts to send and that is forwarded by the gateway.

It can be understood that, in this implementation of the present application, the gateway forwards the consensus message to the normal second server in the node. In other words, the gateway needs to know a faulty server and a server that keeps running normally in the node.

In this implementation of the present application, each server in the node can communicate with the gateway by using a heartbeat mechanism, so that the gateway can know an operation status of each server. That is, the gateway determines an operation status of the first server and an operation status of the second server in the following method: receiving, by the gateway, operation status messages that are sent by the first server and the second server to the gateway based on a predetermined period; and determining, by the gateway, the operation status of the first server and the operation status of the second server based on the operation status messages.

That is, if the gateway can receive a periodic operation status message, the gateway can determine that a server that sends the operation status message operates normally; and if the gateway receives no operation status message from a certain server within a certain time, the gateway can determine that the server is faulty.

The following uses an application instance for description.

Figure 3A:
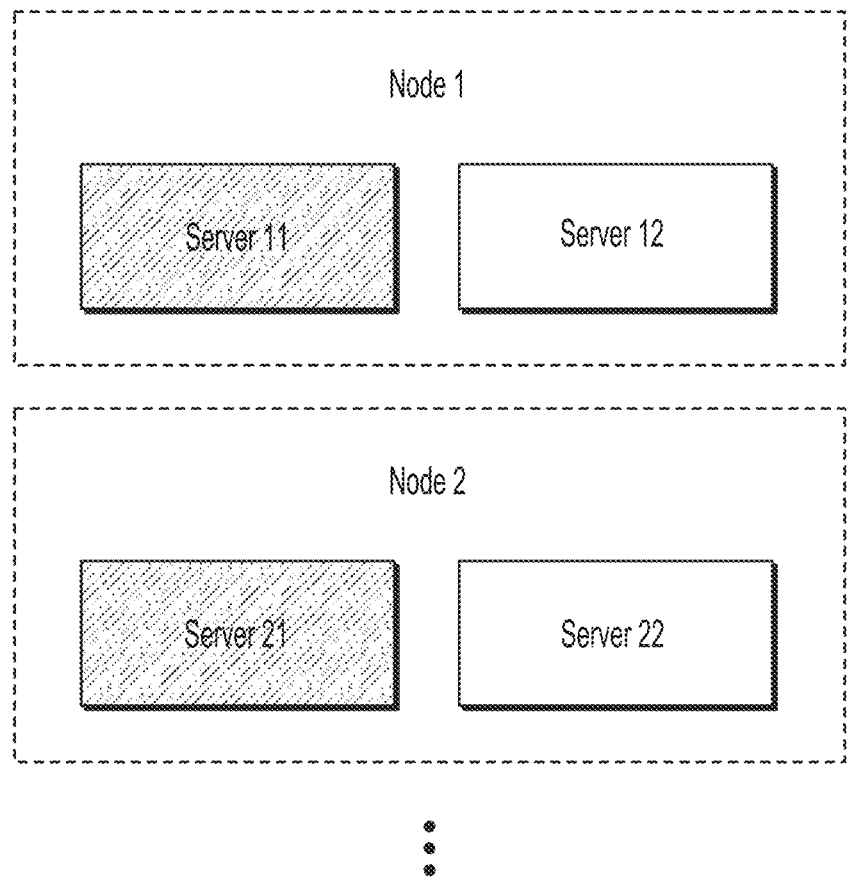
FIG. 3a and FIG. 3b are schematic diagrams illustrating a server change process in the same consensus procedure, according to an implementation of the present application.

For example, as shown in FIG. 3a, it is assumed that both server 11 in node 1 and server 21 in node 2 participate in a certain consensus procedure (FIG. 3a shows, in gray, that the two servers are in the same consensus procedure). It is further assumed that server 21 is offline (that is, in node 2, server 21 is the first server). In this case, server 11 sends a certain consensus message to server 21. Apparently, because server 21 is offline, server 21 does not provide any feedback.

Figure 3B:
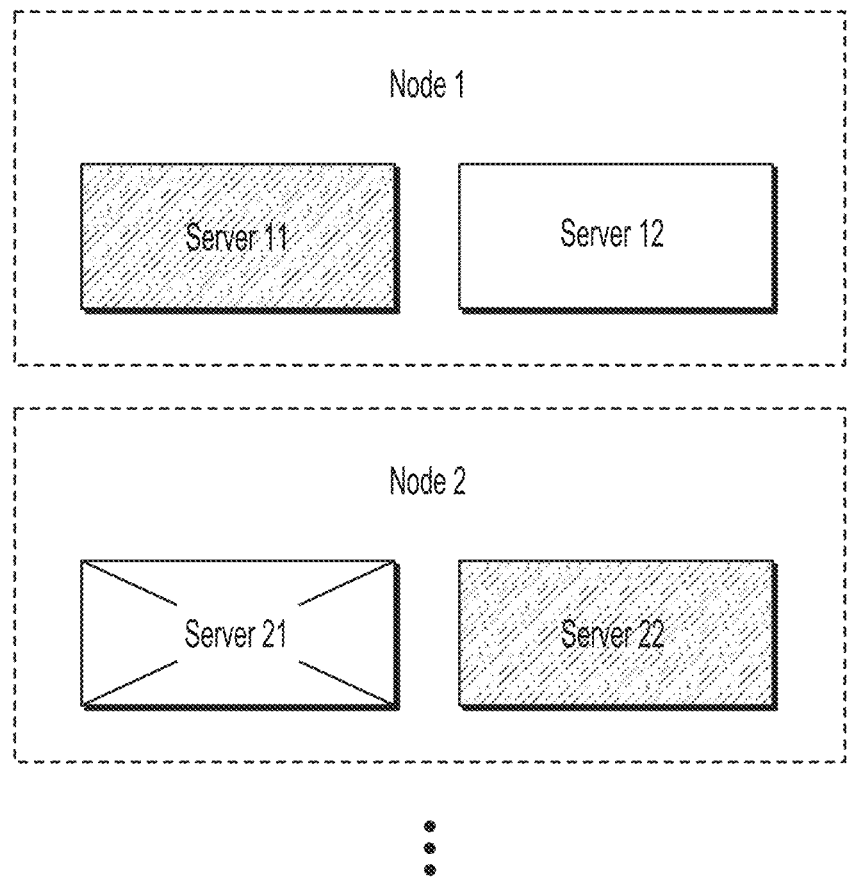

In this case, after waiting for a specific period of time, server 11 initiates a reattempt (the reattempt can also be considered as a reattempt initiated by node 1), in other words, resends the consensus message. After a gateway in node 2 receives the consensus message that node 1 reattempts to send, the gateway selects a certain server that operates normally inside node 2, to process the reattempt of node 1. As shown in FIG. 3b, in this example, server 22 in node 2 is selected (that is, server 22 is the second server). That is, the gateway forwards, to server 22, the consensus message that node 1 reattempts to send, and server 22 executes the consensus procedure in place of server 21.

In addition, for a process of storing, by the second server, the consensus data in the server, in a method in this implementation of the present application, the second server can store a received consensus message (the consensus message can be considered as a type of consensus data) in the database immediately after receiving the consensus message, and store a consensus result (the consensus result can also be considered as a type of consensus data) corresponding to the consensus message in the database after generating the consensus result trough a consensus procedure.

In addition, in another method in this implementation of the present application, after receiving a consensus message, the second server waits for a consensus result to generate through the foregoing process, and then stores the consensus message together with the consensus result in the database.

The previous two storage methods constitute no limitation on the present application.

Figure 4:
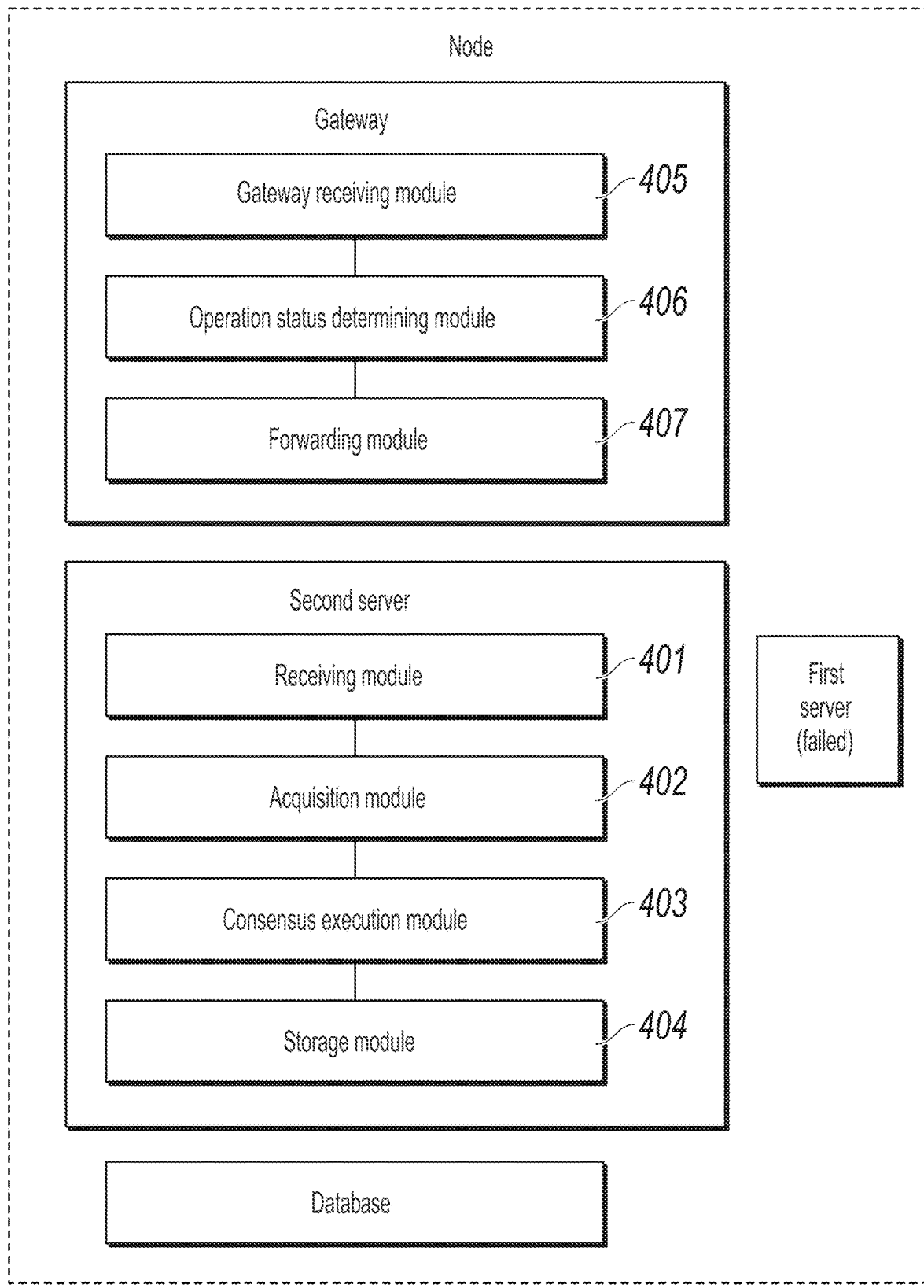
FIG. 4 is a schematic structural diagram illustrating a blockchain-based consensus device on a server side, according to an implementation of the present application.

The blockchain-based consensus method provided in the implementations of the present application is described above. Based on the same idea, as shown in FIG. 4, an implementation of the present application further provides a blockchain-based consensus device. One blockchain node includes a plurality of servers and at least one database. The database stores consensus data needed for performing a consensus procedure, where the consensus data is invoked by a first server and a second server during the consensus procedure.

The first server is faulty before the consensus procedure or during the consensus procedure.

The blockchain-based consensus device includes at least a receiving module 401, an acquisition module 402, a consensus execution module 403, and a storage module 404.

The acquisition module 402 is configured to obtain consensus data from the database.

The consensus execution module 403 is configured to execute the consensus procedure based on the consensus data to generate a consensus result.

The storage module 404 is configured to store the consensus result in the database.

The receiving module 401 is configured to receive a consensus message that is sent by another device participating in the consensus procedure, and the acquisition module is configured to obtain consensus data corresponding to the consensus message from the database based on the consensus message, in response to determining that the first server is faulty before the consensus procedure.

The receiving module 401 is configured to receive a consensus message that another device participating in the consensus procedure reattempts to send, and the acquisition module is configured to obtain consensus data corresponding to the consensus message from the database based on the consensus message, in response to determining that the first server is faulty during the consensus procedure.

The another device reattempts to send the consensus message when the another device sends the consensus message but receives no response after a specified time.

The consensus message includes a service request identifier. The acquisition module 402 is configured to search, based on the service request identifier included in the consensus message, the database for and obtain consensus data corresponding to the identifier.

In addition, the blockchain node can further include a gateway. In this case, the device further includes at least a gateway receiving module 405, an operation status determining module 406, and a forwarding module 407.

The forwarding module 407 is configured to forward, to the normally-running second server, the received consensus message that is sent by the another device participating in the consensus procedure, when the operation status determining module 406 determines that the first server is faulty before the consensus procedure.

The forwarding module 407 is configured to forward, to the normally-running second server, the received consensus message that the another device participating in the consensus procedure reattempts to send, when the operation status determining module 406 determines that the first server is faulty during the consensus procedure.

The gateway receiving module 405 is configured to receive operation status messages that are sent by the first server and the second server to the gateway based on a predetermined period.

The operation status determining module 406 is configured to determine an operation status of the first server and an operation status of the second server based on the operation status messages.

In the 1990s, whether a technical improvement is a hardware improvement (for example, an improvement to a circuit structure such as a diode, a transistor, or a switch) or a software improvement (an improvement to a method procedure) can be clearly distinguished. However, as technologies develop, current improvements to many method procedures can be considered as direct improvements to hardware circuit structures. Almost all designers program an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system into a PLD without requesting a chip manufacturer to design and manufacture an application-specific integrated circuit chip. In addition, at present, instead of manually manufacturing an integrated circuit chip, this type of programming is mostly implemented by using "logic compiler" software. The "logic compiler" software is similar to a software compiler used to develop and write a program. Original code needs to be written in a particular programming language before being compiled. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used at present. A person skilled in the art should also understand that a hardware circuit that implements a logical method procedure can be easily obtained provided that the method procedure is logically programmed by using the foregoing several hardware description languages and programmed into an integrated circuit.

A controller can be implemented in any appropriate way. For example, the controller can be in a form of a microprocessor, a processor, a computer readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. A memory controller can alternatively be implemented as a part of control logic of a memory. A person skilled in the art also knows that, in addition to implementing the controller by using the computer readable program code, method steps can be logically programmed to enable the controller to implement the same function in the form of the logic gate, the switch, the application-specific integrated circuit, the programmable logic controller, the built-in microcontroller, etc. Therefore, the controller can be considered as a hardware component, and a device that is included in the controller and configured to implement various functions can also be considered as a structure in the hardware component. Alternatively, the device configured to implement various functions can even be considered as both a software module for implementing the method and a structure in the hardware component.

The system, device, module, or unit illustrated in the previous implementations can be specifically implemented by using a computer chip or an entity, or by using a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the previous device is described by dividing the device into various units based on functions. Certainly, when the present application is implemented, functions of the units can be implemented in one or more pieces of software and/or hardware.

A person skilled in the art should understand that the implementations of the present disclosure can be provided as a method, a system, or a computer program product. Therefore, the present disclosure can use a form of hardware only implementations, software only implementations, or implementations with a combination of software and hardware. In addition, the present disclosure can use a form of a computer program product that is implemented on one or more computer-usable storage media (including but not limited to a magnetic disk storage, a CD-ROM, an optical memory, etc.) that include computer-usable program code.

The present disclosure is described with reference to the flowcharts and/or block diagrams of the method, the device (system), and the computer program product according to the implementations of the present disclosure. It is worthwhile to note that computer program instructions can be used to implement each process and/or each block in the flowcharts and/or the block diagrams and a combination of processes and/or blocks in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate a device for implementing a specific function in one or more processes in the flowcharts and/or in one or more blocks in the block diagrams.

These computer program instructions can alternatively be stored in a computer readable memory that can instruct a computer or another programmable data processing device to work in a specific way, so that the instructions stored in the computer readable memory generate an artifact that includes an instruction device. The instruction device implements a specific function in one or more processes in the flowcharts and/or in one or more blocks in the block diagrams.

These computer program instructions can alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), one or more input/output interfaces, one or more network interfaces, and one or more memories.

The memory can include a non-persistent memory, a random access memory (RAM), a nonvolatile memory, and/or another form of memory in computer readable media, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a magnetic cassette, a magnetic tape, a magnetic disk memory or another magnetic storage device, or any other non-transmission medium that can be used to store information that is accessible to the computing device. Based on the definition in this specification, the computer readable medium does not include transitory computer readable media (transitory media) such as a modulated data signal and carrier.

It is worthwhile to further note that, the terms "comprise", "include", or any other variants thereof are intended to cover a non-exclusive inclusion, so that a process, a method, a product, or a device that includes a list of elements not only includes those elements but also includes other elements that are not expressly listed, or further includes elements inherent to such process, method, product, or device. Without more constraints, an element preceded by "includes a . . . " does not preclude the existence of additional identical elements in the process, method, product, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a magnetic disk storage, a CD-ROM, an optical memory, etc.) that include computer-usable program code.

The present application can be described in the general context of computer executable instructions executed by a computer, for example, a program module. Generally, the program module includes a routine, a program, an object, a component, a data structure, etc. for executing a specific task or implementing a specific abstract data type. The present application can alternatively be practiced in distributed computing environments. In these distributed computing environments, tasks are performed by remote processing devices that are connected through a communications network. In the distributed computing environments, the program module can be located in both local and remote computer storage media including storage devices.

The implementations in the present specification are described in a progressive way. For same or similar parts of the implementations, mutual references can be made to the implementations. Each implementation focuses on a difference from other implementations. Particularly, a system implementation is basically similar to a method implementation, and therefore is described briefly. For related parts, references can be made to some descriptions in the method implementation.

The previous descriptions are merely implementations of the present application, and are not intended to limit the present application. A person skilled in the art can make various modifications and changes to the present application. Any modification, equivalent replacement, improvement, etc. made without departing from the spirit and principle of the present application shall fall within the scope of the claims in the present application.

Figure 5:
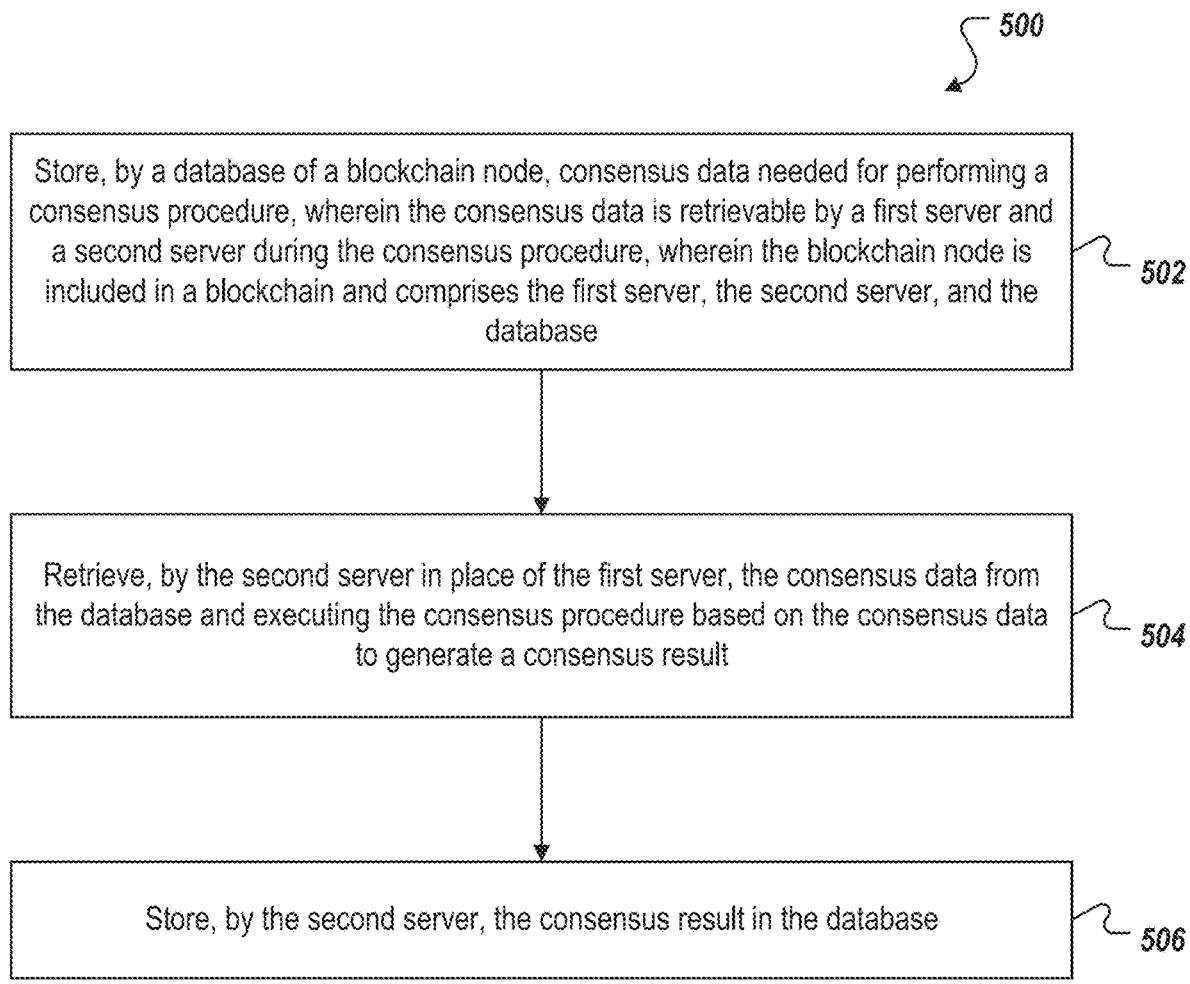
FIG. 5 is a flowchart illustrating an example of a computer-implemented method for blockchain-based consensus, according to an implementation of the present disclosure.

FIG. 5 is a flowchart illustrating an example of a computer-implemented method 500, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

At 502, consensus data needed for performing a consensus procedure is stored by a database of a blockchain node, wherein the consensus data is retrievable by a first server and a second server during the consensus procedure, wherein the blockchain node is included in a blockchain and comprises the first server, the second server, and the database. In some cases, the blockchain node comprises a gateway, and the method comprises determining, by the gateway, that the first server is faulty. In some examples, the method comprises determining, by the gateway, an operation status of the first server and an operation status of the second server by: receiving, by the gateway, operation status messages that are sent by the first server and the second server to the gateway based on a predetermined period; and determining, by the gateway, the operation status of the first server and the operation status of the second server based on the operation status messages. From 502, method 500 proceeds to 504.

At 504, in response to a determination that the first server is faulty, the consensus data is retrieved, by the second server in place of the first server, from the database and the consensus procedure is executed based on the consensus data to generate a consensus result. In some cases, the method comprises: forwarding, by the gateway to the second server, a consensus message that is sent by an external device participating in the consensus procedure, in response to determining that the first server is faulty; receiving, by the second server in place of the first server, the consensus message that is sent by the external device participating in the consensus procedure; and retrieving, by the second server in place of the first server, consensus data corresponding to the consensus message from the database. In some examples, the external device reattempts to send the consensus message upon receiving no response after a specified time. In some implementations, the consensus message comprises a service request identifier. In some cases, retrieving consensus data corresponding to the consensus message from the database comprises: searching, by the second server, the database for consensus data corresponding to the service request identifier; and retrieving the consensus data corresponding to the service request identifier. From 504, method 500 proceeds to 506.

At 506, the consensus result is stored, by the second server, in the database. After 506, method 500 can stop.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for blockchain-based consensus, the computer-implemented method comprising:
   storing, by a database of a blockchain node, consensus data needed for performing a consensus procedure, wherein the consensus data is retrievable by a first server and a second server during the consensus procedure, wherein the blockchain node is included in a blockchain and comprises the first server, the second server, and the database;
   in response to a determination that the first server is faulty:
      receiving, by the second server in place of the first server, a consensus message comprising a service request identifier; and
      retrieving, by the second server in place of the first server, the consensus data from the database and executing the consensus procedure based on the consensus data to generate a consensus result; and
   storing, by the second server, the consensus result in the database.

2. The computer-implemented method according to claim 1, wherein the blockchain node comprises a gateway, and wherein the method comprises:
   determining, by the gateway, that the first server is faulty.

3. The computer-implemented method according to claim 2, comprising:
   determining, by the gateway, an operation status of the first server and an operation status of the second server by:
      receiving, by the gateway, operation status messages that are sent by the first server and the second server to the gateway based on a predetermined period; and
      determining, by the gateway, the operation status of the first server and the operation status of the second server based on the operation status messages.

4. The computer-implemented method according to claim 2, wherein the method comprises:
   forwarding, by the gateway to the second server, the consensus message that is sent by an external device participating in the consensus procedure, in response to determining that the first server is faulty; and
   retrieving, by the second server in place of the first server, consensus data corresponding to the consensus message from the database.

5. The computer-implemented method according to claim 4, wherein the external device reattempts to send the consensus message upon receiving no response after a specified time.

6. The computer-implemented method according to claim 1, wherein retrieving the consensus data from the database comprises:
   searching, by the second server, the database for consensus data corresponding to the service request identifier; and
   retrieving the consensus data corresponding to the service request identifier.

7. A non-transitory, computer-readable medium storing one or more instructions executable by a computer system to perform operations, comprising:
   storing, by a database of a blockchain node, consensus data needed for performing a consensus procedure, wherein the consensus data is retrievable by a first server and a second server during the consensus procedure, wherein the blockchain node is included in a blockchain and comprises the first server, the second server, and the database;
   in response to a determination that the first server is faulty:
      receiving, by the second server in place of the first server, a consensus message comprising a service request identifier; and
      retrieving, by the second server in place of the first server, the consensus data from the database and executing the consensus procedure based on the consensus data to generate a consensus result; and
   storing, by the second server, the consensus result in the database.

8. The non-transitory, computer-readable medium according to claim 7, wherein the blockchain node comprises a gateway, and wherein the method comprises:
   determining, by the gateway, that the first server is faulty.

9. The non-transitory, computer-readable medium according to claim 8, comprising:

determining, by the gateway, an operation status of the first server and an operation status of the second server by:
  receiving, by the gateway, operation status messages that are sent by the first server and the second server to the gateway based on a predetermined period; and
  determining, by the gateway, the operation status of the first server and the operation status of the second server based on the operation status messages.

10. The non-transitory, computer-readable medium according to claim 8, wherein the operations comprises:
  forwarding, by the gateway to the second server, the consensus message that is sent by an external device participating in the consensus procedure, in response to determining that the first server is faulty; and
  retrieving, by the second server in place of the first server, consensus data corresponding to the consensus message from the database.

11. The non-transitory, computer-readable medium according to claim 10, wherein the external device reattempts to send the consensus message upon receiving no response after a specified time.

12. The non-transitory, computer-readable medium according to claim 7, wherein retrieving the consensus data from the database comprises:
  searching, by the second server, the database for consensus data corresponding to the service request identifier; and
  retrieving the consensus data corresponding to the service request identifier.

13. A computer-implemented system, comprising:
  one or more computers; and
  one or more computer memory devices interoperably coupled with the one or more computers and having tangible, non-transitory, machine-readable media storing one or more instructions that, when executed by the one or more computers, perform one or more operations comprising:
    storing, by a database of a blockchain node, consensus data needed for performing a consensus procedure, wherein the consensus data is retrievable by a first server and a second server during the consensus procedure, wherein the blockchain node is included in a blockchain and comprises the first server, the second server, and the database;
    in response to a determination that the first server is faulty:
      receiving, by the second server in place of the first server, a consensus message comprising a service request identifier; and
      retrieving, by the second server in place of the first server, the consensus data from the database and executing the consensus procedure based on the consensus data to generate a consensus result; and
    storing, by the second server, the consensus result in the database.

14. The computer-implemented system according to claim 13, wherein the blockchain node comprises a gateway, and wherein the method comprises:
  determining, by the gateway, that the first server is faulty.

15. The computer-implemented system according to claim 14, comprising:
  determining, by the gateway, an operation status of the first server and an operation status of the second server by:
    receiving, by the gateway, operation status messages that are sent by the first server and the second server to the gateway based on a predetermined period; and
    determining, by the gateway, the operation status of the first server and the operation status of the second server based on the operation status messages.

16. The computer-implemented system according to claim 14, wherein the operations comprises:
  forwarding, by the gateway to the second server, the consensus message that is sent by an external device participating in the consensus procedure, in response to determining that the first server is faulty; and
  retrieving, by the second server in place of the first server, consensus data corresponding to the consensus message from the database.

17. The computer-implemented system according to claim 16, wherein the external device reattempts to send the consensus message upon receiving no response after a specified time.

* * * * *